United States Patent [19]
Barnes et al.

[11] 3,929,125
[45] Dec. 30, 1975

[54] ECTOPIC BEAT DETECTOR

[75] Inventors: Clarence W. Barnes, San Francisco, Calif.; Jack H. Shore, San Rafael, Calif.

[73] Assignee: The Institutes of Medical Sciences, San Francisco, Calif.

[22] Filed: Dec. 3, 1973

[21] Appl. No.: 420,805

[52] U.S. Cl. ........................ 128/2.06 A; 350/160 P
[51] Int. Cl.² ............................................ A61B 5/04
[58] Field of Search .......... 128/2 R, 2.05 Q, 2.05 R, 128/2.06 G, 2.06 R, 2.06 V, 2.1 R; 250/348, 354, 338, 347; 324/96, 97; 356/51, 162; 350/160 P

[56] References Cited
UNITED STATES PATENTS

| | | | |
|---|---|---|---|
| 3,442,264 | 5/1969 | Levitt | 128/2.06 R |
| 3,584,934 | 6/1971 | French | 350/160 P |
| 3,703,718 | 11/1972 | Berman | 250/338 |
| 3,744,877 | 7/1973 | Stamm | 350/160 P |

FOREIGN PATENTS OR APPLICATIONS

| | | | |
|---|---|---|---|
| 697,582 | 10/1940 | Germany | 128/2.06 R |

*Primary Examiner*—William E. Kamm
*Attorney, Agent, or Firm*—Townsend and Townsend

[57] ABSTRACT

Method and apparatus are provided for the continuous analysis of electrocardiograph signals for abnormal or ectopic beats. The signal from the electrocardiograph is divided into two branches, an X component signal and a Y component signal, which individually drive two motors for pivoting first and second mirrors respectively. The mirrors are positioned in light receiving relationship to each other. A light source provides a sharply defined light beam which is reflected from one mirror to the other mirror and then through a photochromic glass plate. The movement of the mirrors in response to the signals defines a closed loop pattern on the photochromic glass plate. A photocell meters the light coming through the photochromic glass plate, so that a change in the light transmitted once the base pattern is established actuates a signaling device.

16 Claims, 4 Drawing Figures

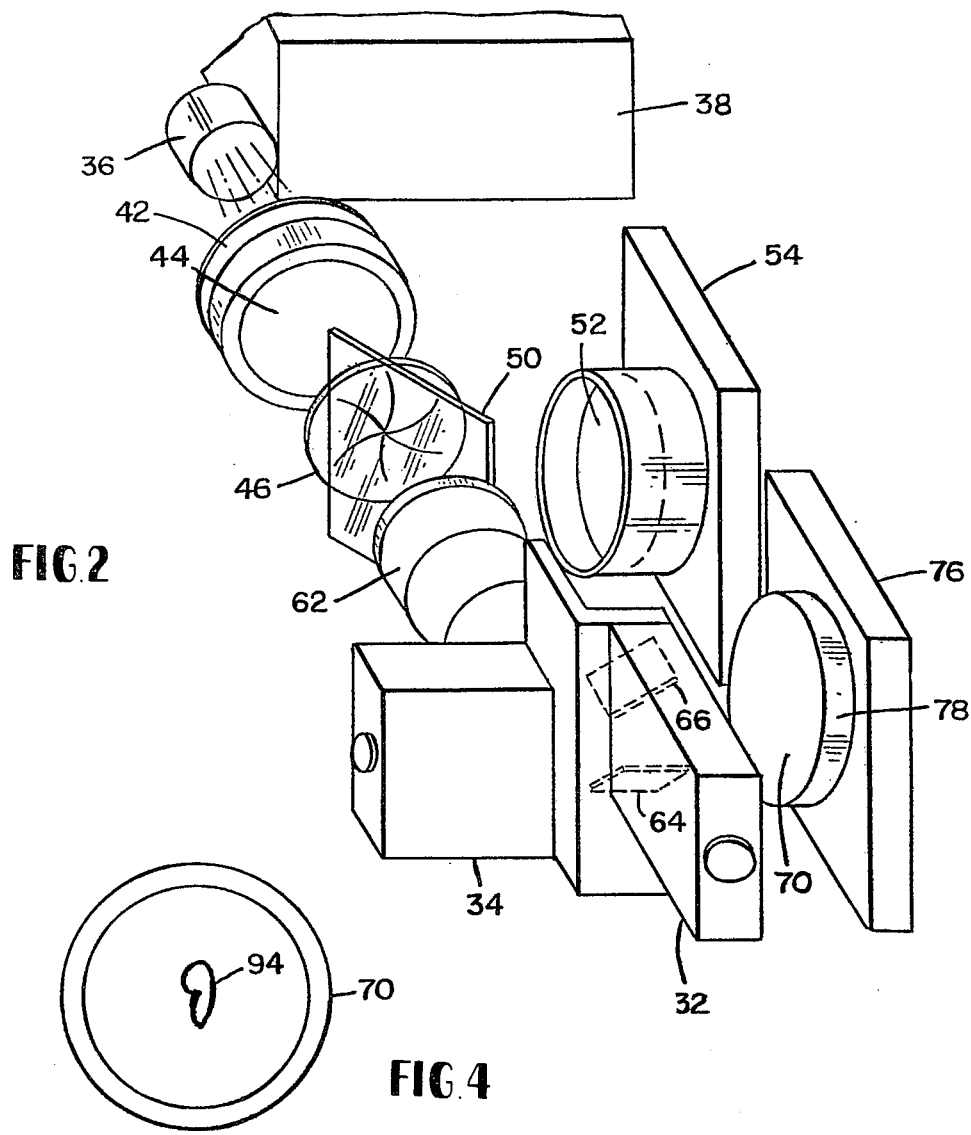
FIG.2
FIG.4
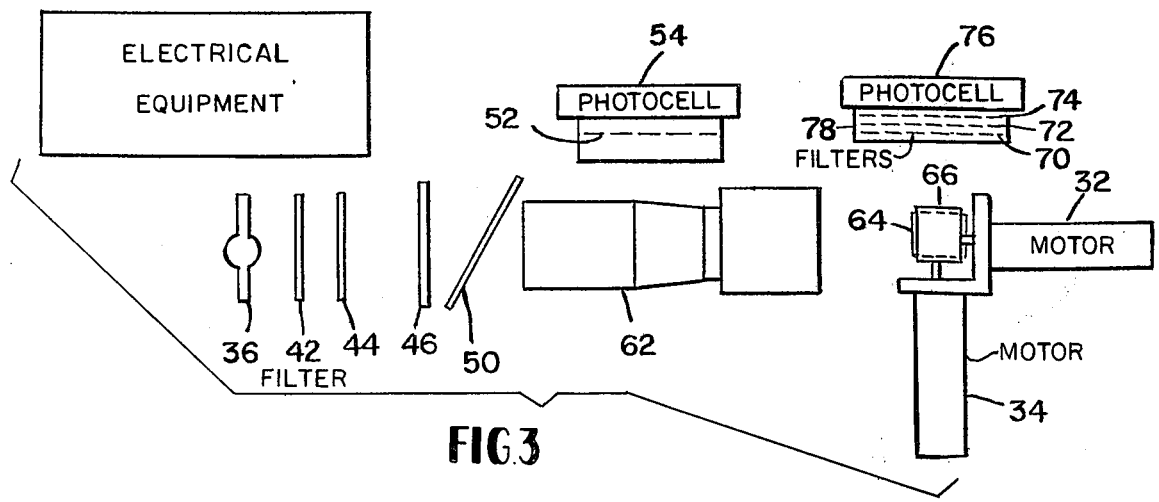
FIG.3

ECTOPIC BEAT DETECTOR

The invention described herein was made in the course of work under a grant or award from the Department of Health, Education and Welfare.

BACKGROUND OF THE INVENTION

1. Field of the Invention

The identification and detection of aberrant or ectopic beats is one of the most important functions of a coronary care unit. Every modern coronary care unit has provision for visual monitoring of EKG (electrocardiograph) complexes on a continuous basis. In the simplest form, the EKG of each patient is displayed on a separate cathode ray tube (CRT). Sometimes, up to 20 individual traces are displayed at one nursing station, but because of fatigue and human inattention, much important information is unnecessarily missed.

Because of the difficulties in human monitoring, much effort and cost has gone into the development of computer methods to analyze electrocardiograms on a beat-to-beat basis, with provisions for appropriate alarms, if a certain number or pattern of ectopic beats is detected. Even under the best circumstances, this uses a considerable amount of computer time, so that when a large number of patients is to be monitored, the cost of computer hardware is high.

A satisfactory arrhythmia detector should be self teaching. It should be capable of determining the predominant or normal pattern and detecting significant variations from this norm. It cannot be based purely on rate histograms, because it should be able to distinguish ventricular ectopics from atrial or nodule conditions in atrial fibrillation. Essentially, it should be able to detect any significant variation from the norm in the shape or size of the QRS complex and should be able to establish a norm for an individual patient.

2. Description of the Prior Art

U.S. Pat. No. 3,552,386 describes a system utilizing digital techniques for comparing EKG signals with the norm signal for an individual patient.

SUMMARY OF THE INVENTION

A method and apparatus are provided for the continuous monitoring of a wave pattern for aberrant waves, such as obtained with electrocardiograph signals for abnormal or ectopic beats. An electrical signal from an electrocardiograph is divided into two channels, one signal being a derivative of the other. The two signals are employed to drive first and second motors or galvanometer light beam recorders, which are individually connected to different mirrors, so as to pivot the mirrors about orthogonal axes in response to the signals received.

A sharply defined light beam is reflected from one mirror to the other mirror and then through a photochromic glass plate, with a photocell behind the glass plate to meter the light which is transmitted. The two signals derived from the electrocardiograph actuate the motors to move the mirrors, so as to define a two-dimensional closed loop pattern on the photochromic glass, which is related to the normal or non-aberrant heartbeat pattern of a patient.

The glass rapidly darkens where the light impinges, so that only a relatively small amount of light is transmitted through the photochromic glass plate. When an aberrant heartbeat pattern occurs, the light moves out of the non-aberrant pattern with an increased transmission of light to the photocell. The resulting increase in voltage from the photocell actuates a signaling device. Alternatively, the glass may be darkened by flooding with blue-ultraviolet and defining a pattern with red-infra-red radiation which bleaches the glass.

BRIEF DESCRIPTION OF THE DRAWINGS

FIG. 2 is a perspective view of the optical system and its photocells;

FIG. 3 is a plan view of the optical system and photocells; and

FIG. 4 is a diagramatic view of a pattern on the photochromic glass plate.

DESCRIPTION OF THE SPECIFIC EMBODIMENTS

Figure 1:
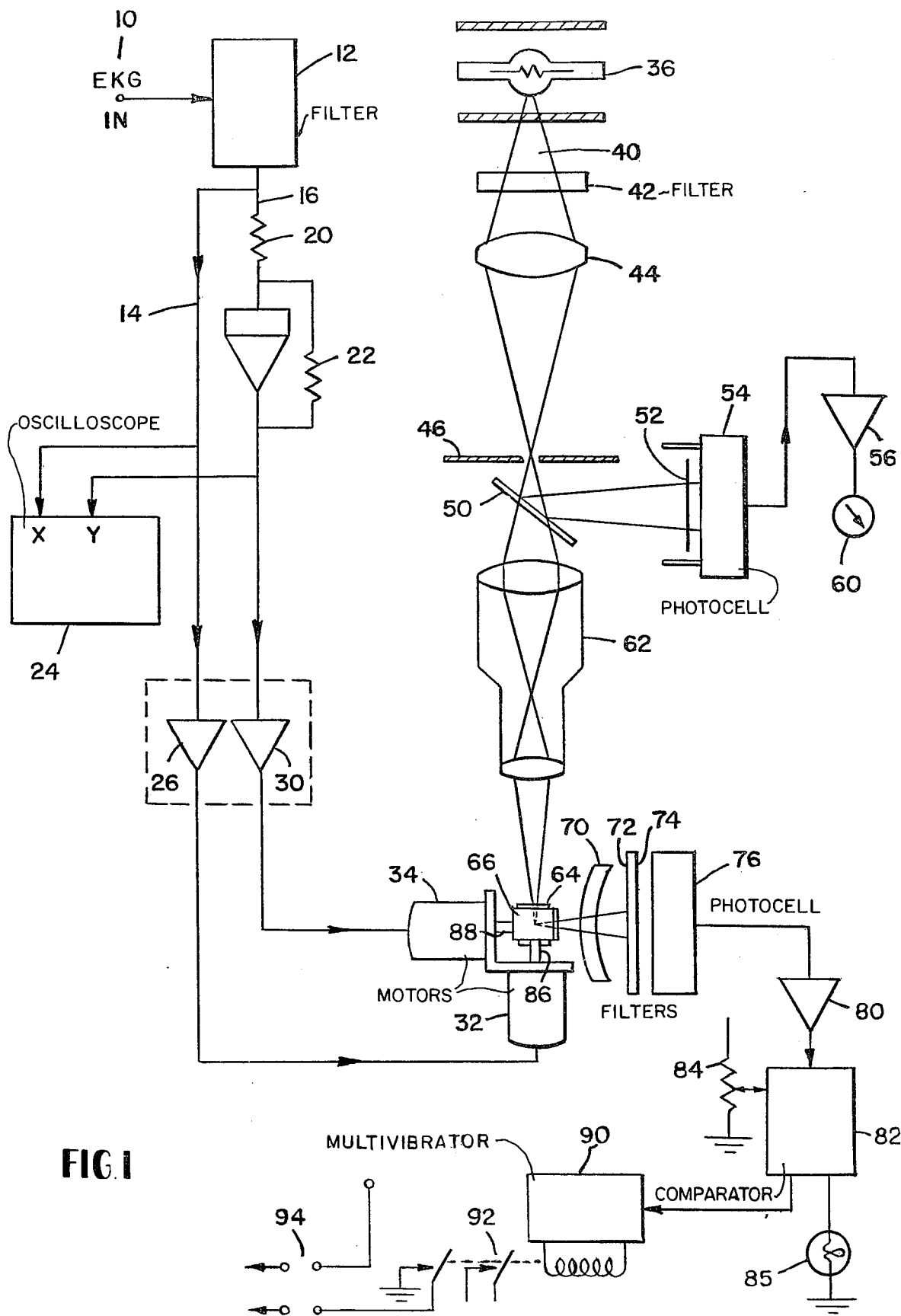
FIG. 1 is a diagramatic view of the ectopic heartbeat monitor of this invention.

The subject method and apparatus provide a convenient, economical and efficient way of detecting a deviation from a repetitive or cyclic periodic signal forming a wave pattern, by first establishing a non-aberrant or norm pattern for the periodic signal by tracing a light pattern specific for the periodic signal onto a photochromic plate of glass to define a two-dimensional imprinted line or loop. By metering the amount of light transmitted through the photochromic glass, a change in the amount of light transmitted trips a signaling device.

The subject invention finds particular use in the metering of the signal from an electrocardiograph employed in monitoring a patient's heart. The principle involves the fact that two signals can be obtained from an EKG, either by connecting two different areas of the body or dividing a single signal into two channels, with one signal a function of the other. A sawtooth sweep triggered by the EKG can be used as the horizontal signal.

For a closed loop pattern, the voltage of an EKG can be plotted against the first derivative of the voltage with respect to time and a two-dimensional plot obtained, similar to a vector cardiogram. The resulting pattern is seen in FIG. 4. In a patient with a regular heartbeat, his pattern is quite consistent, repeating itself within narrow limits. On the occasion of an ectopic beat, a very different area of the screen is occupied with the QRS portion (ventrical contraction) of the trace. The variation is easily detected by an observer.

Photochromic glass plates are available, which employ a dispersion of minute silver halide crystals in glass. These plates have the property of decreasing light transmittance as a result of exposure to light in the 350–440nm range. Transmittance increases with either the passage of time or exposure to infra-red radiation (erasure).

If a device is provided, which provides a light beam which traces a pattern onto photochromic glass in accordance with the above-mentioned vector cardiographic display, a darkening will occur immediately proximal to the repeated sweep of the light beam. Shortly, a steady state should be reached, so that the total light transmitted through the photochromic glass plate will remain essentially constant. This light can be monitored by a photorelay. When an extra systole occurs (or any wave form that is deviant from the patient's normal systole), an undarkened area of the photochromic screen will be swept, resulting in an abrupt increase in light transmittance, and a consequent increase in the light signal.

The above method provides a "self-teaching" device. It establishes the patient's average EKG characteristic, however deviant it is from the physiological normal and signals only when significant changes of wave form occur.

The method in effect translates an electrical signal from an EKG into a light beam which traces a repeating pattern of light in response to the repeating electrical signal and which becomes characteristic of the particular electrical signal related to the heartbeat which the EKG is monitoring. The light beam is traced on a photochromic plate so as to provide a darkened pattern on the plate. The light transmitted through the photochromic glass plate is monitored, conveniently by means of a photocell, which provides an electrical signal related to the light transmitted. A pre-determined level is established, below which there is no actuation of any device or alarm system. This level corresponds to the light transmitted once the pattern is established on the photochromic plate and minor variations from the particular pattern. Upon a substantial increase in light, the increased signal from the photocell serves to actuate one or more devices, which may then serve to monitor the aberrant beat pattern and/or actuate alerting devices.

Alternatively, the photochromic glass plate may be kept in a normally darkened state by flooding with blue-ultraviolet light and selectively bleached by means of a light beam comprising red-infrared radiation. Deviant beats in this case cause an unbleached portion of the glass to be swept and a consequent decrease in the light signal. The resulting change in voltage from the photocell actuates a signalling device.

The device in its simplest form first filters the signal from the EKG, splits the signal into two channels, one channel with the same voltage as the original signal and a second channel with a modified signal, which is a function of the original voltage, conveniently a rate of voltage change. This provides for a closed loop cardioid pattern and a large variation in the loop for a change in slope.

The two electrical signals are translated into a light beam pattern, by means of an optical system.

The optical system has a light source which transmits a sharply defined light beam onto a first mirror. A second mirror is juxtaposed to the first mirror in light receiving relationship, with the two mirrors in overlapping relationship and pivotally mounted about orthogonal axes. The beam from the second mirror passes through a photochromic glass plate onto a photocell. The signal from the photocell is transmitted to a comparator, which is preset to transmit a signal when the voltage received by the comparator changes by more than a predetermined amount. Various devices can then be actuated in order to monitor the ectopic beats or alert the staff.

For further understanding of the invention, the drawings will now be considered. FIG. 1 will be considered first.

An EKG device 10 feeds a signal into a filter 12. The filter serves to minimize base line drift and higher frequency noise. The gain is about 0.5 in the middle of the pass band, low frequency cut off is about 0.1Hz and high frequency about 200Hz. The filtered or conditioned signal from the filter is divided, so as to have one channel providing the same signal, and a second channel 16 having a modified signal.

The signal in the second channel 16 is modified by means of resistor 20 and integrator 22. The modified signal provides an integral of the original signal related to the rate of rise of voltage. As indicated previously, this provides for a closed loop pattern.

If desired, an oscilloscope 24 may be used to tap into the two lines 14 and 16 and provide a pattern on the CRT for visual monitoring.

The signals in the circuits of lines 14 and 16 are amplified by amplifiers 26 and 30 respectively. The power from the two amplifiers 26 and 30 is employed to drive pen motors 32 and 34 respectively. The pen motors or a light recording galvanometer turn a shaft in response to the voltage of the signal received. Since the change in signal is rapid, the motors or galvanometers must be able to rapidly respond to any change in signal. Pen motors supplied by MFE have been found to be satisfactory.

A source of blue-ultraviolet light or of red-infrared light 36 is employed to provide the light beam 40. Included in the light beam is a filter 42 to remove infrared light, in the case where the beam is to consist of blue-ultraviolet light, or to remove blue-ultraviolet light in the case where the beam is to consist of red-infrared light. The light beam is then focused by a 33mm focal length lens 44 and a diaphragm shutter 46, which is set at about a 2mm opening.

in order to insure that any fluctuations in the light transmitted is not a function of fluctuations in the power source, a monitoring device is provided.

The monitoring device comprises a plate of glass 50, conveniently 0.5mm in thickness, set at an angle to the light beam path. The light reflected from the glass plate 50 is filtered through a filter 52 and received by a photocell 54. The voltage from the photocell 54 is amplified by means of an amplifier 56 and a voltage meter 60 is used to monitor the light intensity.

The light beam transmitted through plate glass 50 is further focused by 3 inch focal length lens 62 to provide a beam having a cross section of about 0.25mm. The beam of light 40 then strikes mirror 64 from which it is reflected onto mirror 66. The two mirrors 64 and 66 are flat plate mirrors and are juxtaposed one above the other in overlapping relationship. The centerpoints of the mirrors need not be aligned. The lower mirror 64 is at an angle to the light beam source pivoting about an axis normal to the line of the light beam.

The upper mirror 66 pivots about an axis parallel to the line of the light beam and reflects the light beam toward the photochromic glass plate 70.

The reflected beam is transmitted through photochromic glass plate 70, filter 72 and 1.0 neutral filter 74. The filters serve to reduce the intensity of light reaching the photocell. The high intensity light is desirable to provide a rapidly established pattern in the photochromic glass plate 70. With the light source indicated, patterns can be established in as few as 15–20 seconds.

The photocell 76 receives the reflected filtered light and transmits a signal to amplifier 80, and the amplified signal goes to a comparator 82. A voltage level is set with a potentiometer 84. When the amplified output from the photocell 76 exceeds the voltage level set by the potentiometer, the comparator switches and the comparator indicator lamp 85 goes on.

Because very short on times are apt to occur, the lamp is not very suitable as an indicator of ectopic beats. Therefore, the output from the comparator 82 is fed to a 0.3 second one shot multivibrator 90 which actuates a normally open relay 92. Because of the short duration of the increased signal from the comparator 82, the multivibrator is employed to ensure that the relay closes, each time the signal from the comparator 82 exceeds the predetermined base level. The relay is triggered by negative spikes obtained from the comparator output.

The signal relay 92 has two sets of contacts 94 which close when the relay actuates. The two sets of contacts can be used to actuate various metering devices, such as computers, recorders and the like, as well as alerting signals, such as bells, lights and the like.

Returning now to the mirrors, each of the mirrors 64 and 66 is mounted on shafts 86 and 88 connected to the pen motors 32 and 34 respectively. The mirrors 64 and 66 are mounted on the shafts so as to be able to pivot about an axis, with the axes of the two mirrors being orthogonal to each other. Therefore, the mirror receiving the light beam reflects the light upward along the Y or vertical axis toward the other mirror, which reflects the light beam along the X or horizontal axis. By simultaneous movement of the two mirrors, in response to the signals received from channels 14 and 16, a closed loop pattern is transmitted to the photochromic glass plate. The cardioid pattern 94 which results is depicted in FIG. 4.

In FIGS. 2 and 3, the geometry of the optical path is indicated. The light beam source assembly includes the lamp 36 which is positioned directly behind and in close juxtaposition to the heat absorbing glass 42 and lens 44. The electrical equipment is indicated by the box fragment 38. The focused light beam is then directed through diaphragm shutter 46, which can be any convenient adjustable shutter.

The light beam is then divided by transparent glass 50 into a beam which passes through filter 52 into photocell 54. The major portion of the beam is transmitted through glass 50 into lens 62, where it is further focused. The light beam then strikes the mirror 64, which reflects the light beam onto mirror 66. From mirror 66, the light beam is reflected through photochromic glass plate 70 and filters 72 and 74, which are contained in filter holder 78, and then onto photocell 76.

For amplifying the signals, Analog Device type 183 has been found a convenient operational amplifier and was used in each instance except for the multivibrator, for which a Fairchild 741 DC operational amplifier was employed. Input resistors for the photocell amplifiers were chosen at 1K load for each photocell, which provides a relatively fast response time.

In setting the trigger level for the multivibrator, it should not be set too low. If the level is too low, the comparator is continuously on, so that the multivibrator remains off after its initial 0.3 second on. Therefore, after some experience, a satisfactory level can be achieved. Because the amount of light which is transmitted through the pattern is relatively low, usually once a satisfactory predetermined level is determined, this level can be used with different patterns with different patients.

The subject invention provides a simple, efficient and economical method for metering periodic signals, particularly signals from an EKG device. Without the need for continual monitoring by computers, a normal or non-aberrant pattern is rapidly developed for a particular patient and significant deviation from this pattern results in a signal which can be used to actuate a computer to monitor a beat, to alert hospital staff, or to actuate other monitoring or signaling devices.

With many healthy people, there is a recurrent ectopic beat as part of the normal pattern. With the subject device, such recurring ectopic beat may register as part of the normal pattern. The device is particularly useful for monitoring patients at rest to avoid continual visual monitoring.

The subject invention can be used not only for monitoring a heart patient, but for monitoring any system from which a repetitive signal pattern is attainable and there is interest in a deviation from the pattern. For example, an alarm system employing a radar sweep of a room, would provide a repetitive pattern. Anyone moving in the room would change the pattern, resulting in the actuating of an alarm or other device. The waveform of a motor, generator or pump can be monitored, so that any deviation from normal operation would be detected.

Although the foregoing invention has been described in some detail by way of illustration and example for purposes of clarity of understanding, it will be obvious that certain changes and modifications may be practiced within the scope of the appended claims.

What is claimed is:

1. A method for monitoring a cyclic electrical signal which comprises:

continuously transforming said electrical signal into a repetitive light beam pattern specific for each cycle of said cyclic electrical signal;

continuously transmitting said light beam pattern to a photochromic glass plate to imprint a two-dimensional pattern specific for each cycle of said cyclic electrical signal;

continuously transforming the light transmitted through said photochromic glass plate into a light intensity dependent electrical signal defining a base signal level corresponding to the repetitive cycle resulting from each cycle of said cyclic electric signal; and actuating a signaling device when said light intensity dependent electrical signal differs from said base signal level by a predetermined amount corresponding to an aberrant cycle.

2. A method according to claim 1, wherein said light beam is in the blue-ultraviolet radiation range and wherein said two-dimensional pattern is a dark pattern.

3. A method according to claim 1, including the step of continually illuminating said photochromic glass plate with light in the blue-ultraviolet radiation range, so as to darken said photochromic glass plate and wherein said light beam is in the red-infrared radiation range and forms a light two-dimensional pattern.

4. A method for metering the occurrence of ectopic or aberrant heartbeats, where a patient's heart is metered by an electrocardiograph comprising:

continuously producing a light beam pattern onto a photochromic glass plate in response to a cyclic electrocardiograph output electrical signal, wherein said light beam pattern is specific to each cycle of said cyclic output electrical signal and establishes an imprinted line on said plate corresponding to the repetitive cycle of said light beam pattern;

transforming the light transmitted through said photochromic glass plate into a light intensity dependent electrical signal defining a base signal level for each cycle of said repetitive cyles of non-aberrant heartbeats; and actuating a signaling device, when said light intensity dependent electrical signal differs from said base signal level by a predetermined amount, as a result of a change in said light beam pattern.

5. A method according to claim 4, wherein said light beam pattern is produced by movement of a narrow light beam in correspondence to a periodic variation in said output electrical signal.

6. A method according to claim 5, including the steps of:
dividing said output electrical signal into first and second electrical signals, said second signal being modified to be a function of said first signal;
shining a light beam onto a first of first and second mirrors, said first and second mirrors being in light receiving relationship with each other; and
moving said first and second mirrors in response to said first and second signals to produce said light beam pattern.

7. A method according to claim 6, including the step of:
extending said light intensity dependent electrical signal for a predetermined time duration prior to said actuating and wherein said actuating includes closing a normally open relay.

8. A method for metering the occurrence of ectopic or aberrant heartbeats, where a patient's heart is metered by an electrocardiograph comprising:
continuously dividing the output signal of said electrocardiograph into first and second cyclic signals, said second signal being a function of said first signal;
continuously moving first and second mirrors in light receiving relationship with each other in response to said first and second cyclic signals;
continuously shining a narrow light beam on to one of said mirrors, so that the other of said mirrors continuously traces a pattern of light for each cycle of said cyclic signals onto a photochromic glass plate to imprint a dark closed loop pattern on said plate;
continuously transforming the light transmitted through said photochromic glass plate into a light intensity related electrical signal, whereby a base level signal is initially established corresponding to said dark closed loop pattern; and
actuating a signaling device when said light intensity related electrical signal differs by a preset amount from said base level signal as a result of a change in said pattern of light.

9. A method according to claim 8, wherein said function is an integral of said first signal.

10. An apparatus for metering the occurrence of an aberrant electrical signal in a continuous repetitive cyclic wave pattern such as ectopic or aberrant heartbeats, where a patient's heart is metered by an electrocardiograph comprising:
a photochromic glass plate;
means for continuously producing a light pattern on said glass plate corresponding to an electrical input signal corresponding to each cycle of said continuous repetitive cyclic wave pattern;
means for continuously transforming the light intensity transmitted through said photochromic glass plate into an electrical light intensity related output signal; and
means for continuously receiving said light intensity related output signal and actuating a device, when corresponding to an aberrant cycle said light intensity related output signal differs from a preset amount from a predetermined base level.

11. An apparatus according to claim 10, wherein said light pattern producing means includes:
a light beam source;
first and second mirrors in light receiving relationship with each other and pivotally mounted for pivoting about orthogonal axes, said first mirror in light receiving relationship with said light beam source and said second mirror reflecting light to said photochromic glass plate;
means for dividing said input signal into first and second signals, wherein said second signal is a function of said first signal; and
first and second galvanometer means for receiving said first and second signals respectively, and pivoting said first and second mirrors in response to the variation in said first and second signals.

12. An apparatus according to claim 11, wherein said first and second mirrors are mounted in overlapping relationship.

13. An apparatus according to claim 11, wherein said receiving and actuating means includes means for extending the duration of said light intensity related signal and relay means for receiving said extended signal.

14. An apparatus according to claim 11, wherein said second signal varies as the integral of said first signal, so that said light pattern is a cardioid.

15. An apparatus according to claim 10, wherein said transforming means is a photocell; and
said receiving and actuating means includes comparator means for comparing said light intensity related signal to a predetermined voltage level, means for extending the duration of said light intensity related signal and normally open relay means in output receiving relationship with said extending means.

16. An apparatus for metering each cycle of a cyclic electrical signal defining a wave pattern for deviations from said pattern which comprises:
a light beam source;
a photochromic glass plate;
first and second galvanometer motors;
first and second mirrors operatively connected to said first and second motors for pivoting about orthogonal axes, juxtaposed in overlapping relationship, said first mirror positioned in light receiving relationship to said light beam source and said second mirror positioned in light transmitting relationship to said photochromic glass plate;
means for continuously receiving and modifying each cycle of said cyclic electrical signal into a first signal and a second signal as the integral of said first signal;
means for continuously transmitting said first and second signals to said first and second motors respectively;
means for continuously transforming the light transmitted through said photochromic glass plate into a light intensity dependent electrical signal; and
comparator means for comparing said light intensity dependent electrical signal for each cycle to a predetermined base level and actuating a signaling device when said light intensity dependent signal differs by a preset amount from said base level.

* * * * *